United States Patent
Cisar

(10) Patent No.: US 7,155,258 B1
(45) Date of Patent: Dec. 26, 2006

(54) COMMUNICATIONS MODULE HAVING A DETACHABLE ANTENNA SECTION

(75) Inventor: James M. Cisar, Wadsworth, OH (US)

(73) Assignee: Cisco Technology, Inc., San Jose, CA (US)

( * ) Notice: Subject to any disclaimer, the term of this patent is extended or adjusted under 35 U.S.C. 154(b) by 470 days.

(21) Appl. No.: 09/849,786

(22) Filed: May 4, 2001

(51) Int. Cl.
*H04M 1/00* (2006.01)

(52) U.S. Cl. .............................. 455/562.1; 455/552.1; 455/80

(58) Field of Classification Search ............. 455/552.1, 455/553.1, 554.2, 575.1, 41.1, 41.2, 41.3, 455/562.1, 450, 452.1, 80; 343/702, 846; 370/463, 338
See application file for complete search history.

(56) References Cited

U.S. PATENT DOCUMENTS

| | | | |
|---|---|---|---|
| 6,266,017 B1* | 7/2001 | Aldous | 343/702 |
| 6,336,039 B1* | 1/2002 | Usui et al. | 455/558 |
| 6,393,280 B1* | 5/2002 | Lee et al. | 455/426.2 |
| 6,690,947 B1* | 2/2004 | Tom | 455/556.1 |
| 6,895,255 B1* | 5/2005 | Bridgelall | 455/552.1 |
| 2002/0118508 A1* | 8/2002 | Paredes et al. | 361/686 |
| 2003/0199288 A1* | 10/2003 | Bodnar et al. | 455/557 |
| 2004/0057455 A1* | 3/2004 | Choi | 370/463 |
| 2005/0087603 A1* | 4/2005 | Koenck et al. | 235/472.02 |

OTHER PUBLICATIONS

Aironet 1200 and 200 series PCMCIA Wireless LAN Client Card User's Guide—1998 DOC. 710-003945 Rev A0.*
Aironet 1200 and 200 series ISA Wireless LAN Client Card User's Guide—1998 DOC. 714-003944 Rev. A0.*
Aironet 690 PCMCIA Wireless LAN Adapter User's Guide (Two Pages)—1994.
Aironet 655 ISA Wireless LAN Client Adapter User's Guide (Two Pages)—1994.

* cited by examiner

*Primary Examiner*—Matthew D. Anderson
*Assistant Examiner*—Tan Trinh
(74) *Attorney, Agent, or Firm*—Tucker Ellis & West LLP

(57) ABSTRACT

A communications module having a "universal" digital section and a detachable antenna section for providing compatibility with multiple communications standards. The antenna section is configured for communications with a specific communications standard, while the "universal" digital section is configured for operation with a plurality of communication standards.

26 Claims, 2 Drawing Sheets

COMMUNICATIONS MODULE HAVING A DETACHABLE ANTENNA SECTION

FIELD OF INVENTION

The present invention generally relates to a communications module, and more specifically to a communications module having a detachable antenna section, and operable in multiple modes.

BACKGROUND OF THE INVENTION

One common type of communications module is a radio module used as a wireless LAN adapter (also referred to as a client adapter). Radio modules provide transparent wireless data communications between fixed, portable, or mobile devices and other wireless devices or a wired network infrastructure.

The primary function of the radio modules is to transfer data packets transparently through a wireless infrastructure. The radio modules operate similar to standard wired network communication devices, except that a cable is replaced with a radio connection. In general, no special wireless networking functions are required, and all existing applications that operate over a network operate using the radio modules.

Radio modules typically take such forms, including, but not limited to adapters commonly referred to as: (i) an extended type II PCMCIA client adapter (also known as a "PC card" client adapter), (ii) a regular type II PCMCIA client adapter (also known as an "LM card" client adapter), and (iii) a PCI client adapter. An extended type II PCMCIA client adapter is a PCMCIA card radio module that can be inserted into any device equipped with an external Type II or Type III PC card slot. Host devices may include laptops, notebook computers, personal digital assistants, and hand-held or portable devices. A regular type II PCMICIA client adapter is a PCMCIA card radio module that can be inserted into any device equipped with an internal Type II or Type III PC card slot. Host devices usually include hand-held or portable devices. A PCI client adapter is a client adapter card radio module that can be inserted into any device equipped with an empty PCI expansion slot, such as a desktop computer.

It should be understood that the term communications module, as used herein, refers to radio modules (including the three different types of client adapters discussed above), as well as other types of communications modules, including but not limited to global positioning devices of a global positioning system (GPS), modems, ethernet adapters, and USB PCMCIA adapters. It should be further noted that the term "workstation" (or "station"), as used herein, refers to a computing device with an installed communications module.

A typical radio module includes a radio and a radio antenna. For example, the radio may take the form of a direct-sequence spread spectrum (DSSS) radio that operates in the 2.4-GHz license-free Industrial Scientific Medical (ISM) band, in accordance with IEEE 802.11b. The radio antenna, for example, may take the form of a permanently attached diversity antenna. In the case of an extended type II PCMCIA client adapter, a built-in antenna is typically housed within the section of the radio module that extends outward from a PC card slot when the radio module is installed. In the case of a regular type II PCMCIA client adapter, the antenna is connected via an external connector. If a snap-on antenna is used, it is typically operated in diversity mode. PCI client adapters commonly include a 2-dBi dipole antenna that attaches to the adapter's antenna connector. However, other types of antennas may be used.

At present, many wireless communication systems, such as wireless local area networks (LANs), are being standardized around two radiofrequency (RF) bands, namely the 2.4 GHz ISM (Industrial, Scientific and Medical) bands, in accordance with IEEE 802.11b, and the 5 GHz UNII (Unlicensed National Information Infrastructure) band, in accordance with 802.11a. The IEEE 802.11b standard uses traditional spread-spectrum technology, whereas the IEEE 802.11a standard uses a frequency division multiplexing scheme known as OFDM (orthogonal frequency division multiplexing).

As both types of wireless communication systems are deployed, there is a growing need for a communications module (i.e., dual band radio module) which is suitably adaptable for communication using either of the frequency bands. Such a communications module will be inherently more expensive and consume more power than a communications module adapted for only one frequency band. Moreover, such a communications module presents problems in laying out a printed circuit board (PCB) to accommodate communications using both frequency bands.

The present invention addresses these and other drawbacks of prior art communications modules.

SUMMARY OF THE INVENTION

According to the present invention there is provided a communications module comprising: (a) a first section for processing data in accordance with at least a first communication standard; and (b) a second section for transmitting and receiving data via an antenna in accordance with the first communication standard, said second section detachable from the first section.

According to another aspect of the present invention, there is provided a communications module comprising: (a) a first section including means for processing data in accordance with at least a first communication standard; and (b) a second section including means for transmitting and receiving data via an antenna in accordance with the first communication standard, said second section detachable from the first section.

An advantage of the present invention is the provision of a communications module that is low cost and suitably adaptable for communication using a plurality of frequency bands.

Another advantage of the present invention is the provision of a communications module having increased modularity to provide adaptability to communicate using a plurality of frequency bands.

Still another advantage of the present invention is the provision of a communications module that minimizes upgrade costs by increasing modularity.

Yet another advantage of the present invention is the provision of a communications module that reduces power consumption, as compared with a conventional "dual standard" communications module.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

A preferred embodiment of the present invention is described herein with reference to a communications module usable with multiple communication standards, namely IEEE 802.11b and IEEE 802.11a. It should be appreciated that these two communications standards are shown for the sole purpose of illustrating a preferred embodiment of the present invention, and not for limiting same. In this regard, it is contemplated that the present invention can be used to provide a communications module that is suitable for communications using a plurality of communication standards, including those unrelated to IEEE 802.11.

Figure 1:
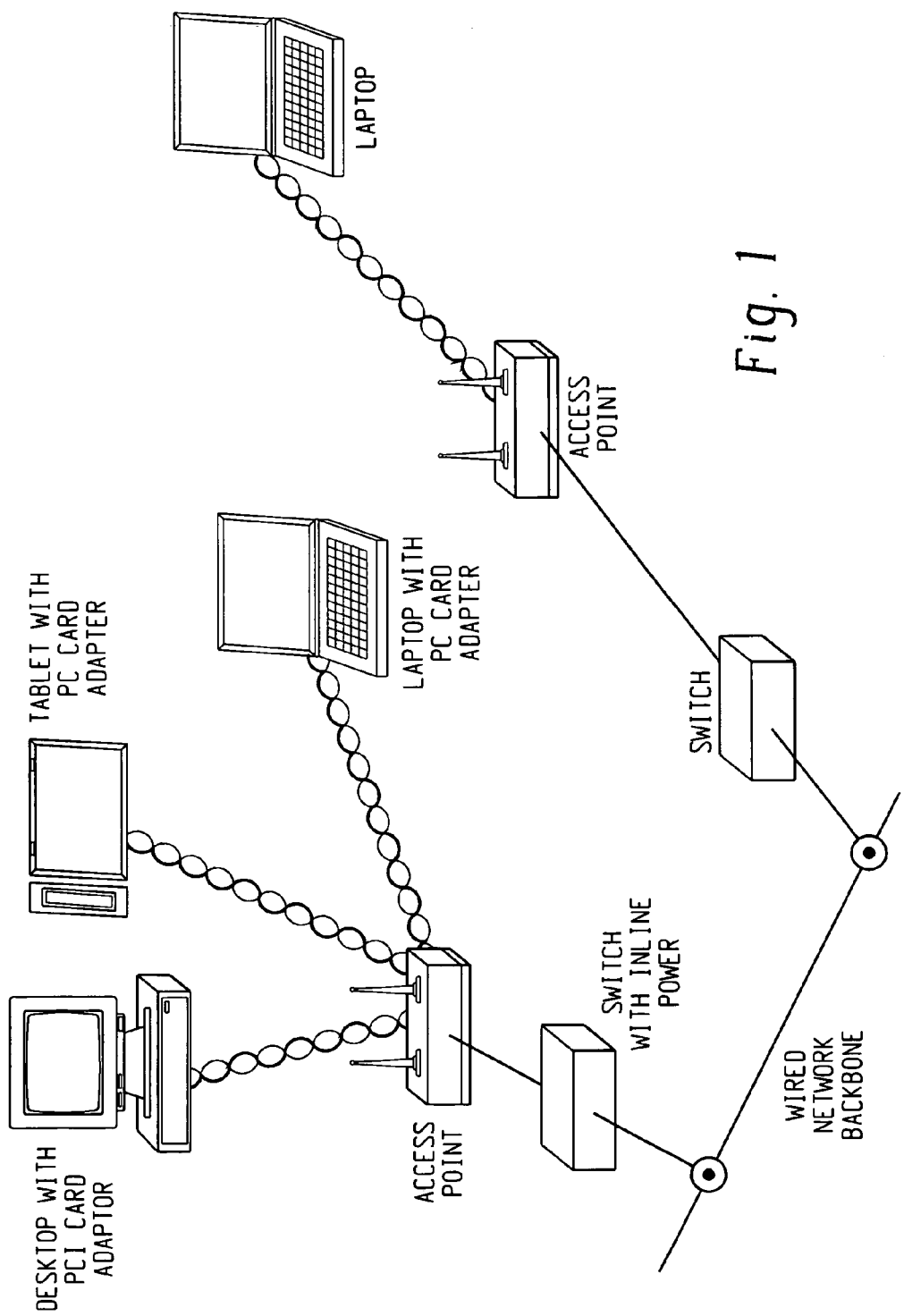
FIG. 1 illustrates an exemplary wireless local area network (WLAN).

Referring now to the drawings wherein the showings are for the purposes of illustrating a preferred embodiment of the invention only and not for purposes of limiting same, FIG. 1 illustrates an exemplary WLAN, wherein each desktop PC, tablet, and laptop, have a communications module for wireless radio communication with an access point (also referred to herein as a "base station").

Wireless local area networks (WLANs) provide network connections to mobile devices. They have gained market acceptance in recent years due largely to the proliferation of laptop computers, the emergence of an industry standard for WLANs, the establishment of a license free band of operation (e.g., the 2.4 GHz ISM band and the 5 GHz UNII band), and the declining cost of electronic equipment. Nearly all laptops have one or more PC card slots that can accept numerous cards providing functions such as data storage, modems, Ethernet adapters, and WLAN adapters. WLAN adapters communicate with base stations that are themselves connected to traditional wired local area networks (LANs). The Institute of Electrical and Electronic Engineers (IEEE) has established a standard or these adapters and base stations known as 802.11. The benefit of a standard such as this is that interoperability between vendors is assured. Therefore, users can choose among various manufacturers and expand their WLANs with their choice of equipment and features.

The rapid pace of technology and the need for faster WLANs speeds has caused a second standard to emerge. The original standard is known as 802.11b and is designed for operation in the 2.4 GHz ISM band. Another standard, known as 802.11a, is designed for operation in the 5 GHz UNII band. IEEE 802.11a can support modulation techniques that support data rates much higher than currently possible in 802.11b. Furthermore, the 5 GHz frequency band contains less interference than the 2.4 GHZ frequency band. In this regard, devices such as microwave ovens, wireless phones and garage door openers use the 2.4 GHz frequency band. While not catastrophic, these interference sources concern users in the long term. Furthermore, many users also see an eventual need for the higher data rates.

However, many 802.11a products will be developed and deployed years later than 802.11b devices. Thus, it is anticipated that eventually both types of systems will coexist and proliferate. For example, wireless communications on some floors of a building may be using one communications standard (e.g., 802.11b), while communications on other floors of a building use a different communications standard (e.g., 802.11a). This presents a concern to users that costs will be incurred to obtain more than one type of communications module, wherein each communications module is respectively compatible with a different communications standard.

More specifically, in accordance with the illustrated preferred embodiment of the present invention, there is provided a communications module in the form of a PC card client adapter having a digital section (digital through baseband (BB) stages) that is universally suitable for use with a plurality of communication standards (including but not limited to communications on the 2.4 GHz ISM band and the 5 GHz UNII band), and a detachable antenna section. (also referred to as an "RF section"). Accordingly, the present invention allows reuse of a major portion of a user's original investment in a communications module. In this regard, the present invention allows a communications module designed for use with one communications standard (e.g., 802.11b) to be upgraded for use with a second communications standard (e.g., 802.11a). This upgrade feature is achieved by providing a detachable antenna section, thus increasing modularity.

It should be understood that in a typical wireless local area network (WLAN) configuration, a portable or mobile device (e.g., a laptop personal computer) normally includes a HOST processor and a communications module in the form of a PCI card or PCMCIA card. On this card resides a Medium Access Control (MAC) processing system, a PHY (physical layer) processing device (e.g., a digital signal processor), memory, antenna and other associated circuitry, as will be described below.

Figure 2:
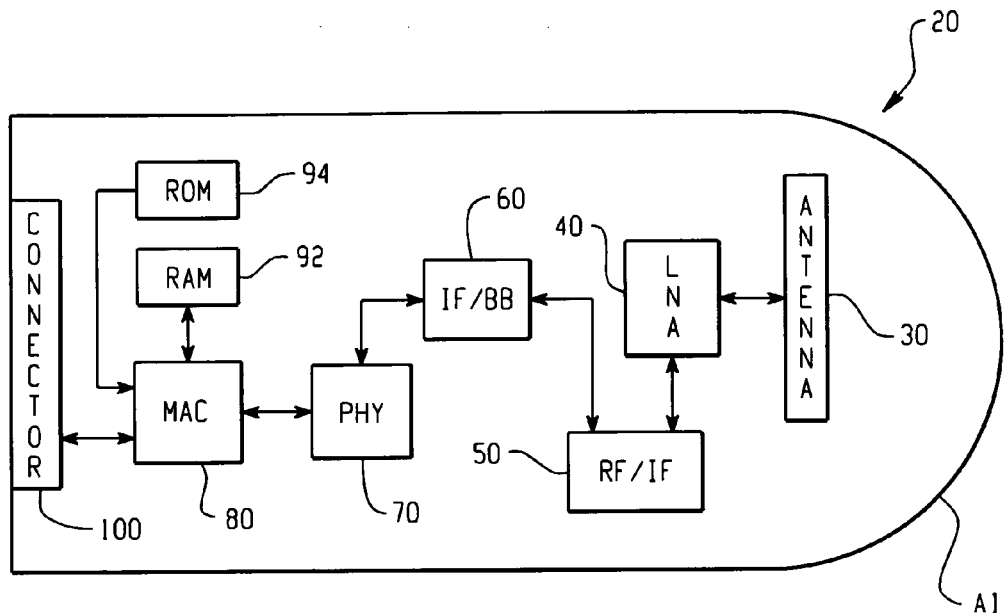
FIG. 2 illustrates a conventional communications module.

Referring now to FIG. 2, there is shown a prior art communications module 20 generally comprised of an antenna 30, a low noise amplifier (LNA) 40, RF/IF (radiofrequency to/from intermediate frequency) block 50, IF/BB (intermediate frequency to/from baseband frequency) block 60, PHY 70, MAC 80, RAM 92, non-volatile memory (ROM) 94, and connector 100. These elements are shown in the approximate physical layout of a typical PC card client adapter, which are most commonly of the PCMCIA Type II configuration. A unitary housing A1 houses the elements. The portion of housing A1 which houses the antenna typically protrudes outside of a PCMCIA slot of a laptop to provide improved radio performance.

The communications module illustrated in FIG. 2 can be divide into two basic sections, namely: (1) a digital section and (2) an antenna section (also referred to as an "RF section"). The digital section is generally comprised of PHY 70, MAC 80, RAM 92, optional non-volatile memory (e.g., flash ROM) 94 and connector 100, whereas the antenna section is generally comprised of antenna 30, LNA 40, RF/IF 50 and IF/BB 60.

The basic functions of the digital section are as follows: 1) communicate with the host processor (this is typically done over an industry standard bus such as PCMCIA, PCI, or others); 2) execute protocol specific to the communication device; and 3) modulate and demodulate data.

MAC 80 is a Medium Access Control (MAC) processing system, The MAC processing system includes a MAC processor (e.g., an embedded processor) which is a multifunctional processor engine responsible for a variety of different processing tasks associated with the wireless communications. The MAC processor typically takes the form of a Reduced Instruction Set Computer (RISC) data processing device. This allows fast execution of the specific protocol in use while keeping power consumption and die size low. MAC 80 typically communicates with a host processor (not shown) over an industry standard bus such as PCMCIA, PCI, and others. A connector 100 connects communications module 20 with the bus. RAM 92 is used by MAC 80 to store data going to and from PHY 70. MAC 80 can act upon the data, for example, by encrypting or decrypting it, or by interpreting the data and making decisions as to how and when to forward it. In executing 802.11 protocols, for example, MAC 80 must manage the association of clients, the creation of contention and non-contention time windows, and send beacons for time reference.

PHY 70 is a physical layer (PHY) processing device (e.g., a modem or digital signal processor). PHY 70 typically performs digital signal processing, such as analog-to-digital and digital-to-analog conversion, and encoding/decoding of waveforms (modulation/demodulation). The digital signal processing can be done with general purpose digital signal processing integrated circuits, or in specially designed digital logic. In either case, PHY 70 is modulating/demodulating data to be compatible with the appropriate communication standard. In IEEE 802.11a this involves OFDM, while in IEEE 802.11b it involves Direct Sequence Spread Spectrum (DSSS). On one side of PHY 70, data is exchanged with MAC 80, while on the other side of PHY 70, it is exchanged with the antenna section. In the latter case, PHY 70 typically includes analog-to-digital (A/D) converters for data received from the antenna section, and digital-to-analog (D/A) converters for data transmitted to the antenna section.

Non-volatile memory (ROM) 94 is typically used to permanently store specific information, such as the unique identifier of the communication device, as well as the firmware for MAC 80.

In the case of IEEE 802.11b and 802.11a, the technology of the digital section is applicable in both standards. The increased speed and reduced size of integrated circuits means that little or no cost penalty is imposed for the sections represented by PHY 70 and MAC 80 to operate in connection both IEEE standards.

It should be appreciated that PHY 70, MAC 80, RAM 92, ROM 94 and connector 100 can be common to communication modules of multiple communications standards (e.g., IEEE 802.11b and 802.11a). Moreover, it is noted that these elements typically represent more than 50% of the component cost of a communications module.

IF/BB block 60 converts signals between intermediate and baseband frequencies. IF/RF block 50 converts signals between intermediate frequencies and radiofrequencies. In the illustrated preferred embodiment, LNA 40 is a low noise amplifier for receive or a suitable power amplifier for transmission of the 2.4 GHz or 5 GHz frequency band signals. Antenna 30 is typically a patch type antenna specific to the frequency band, and thus may vary for different communication standards. In accordance with the prior art, two antennas may be used to provide diversity, thus avoiding nulls in the RF patterns, as found inside buildings.

In view of the foregoing, it should be appreciated that the components of the antenna section are specific to the communications standard being used. Unlike the digital section, it is not economical to make the circuitry in the antenna section universal for multiple communication standards. Therefore, essentially two distinct circuits would have to coexist with two unique antenna solutions in order to provide a 'dual standard' communications module. Any such communications module would require users to incur the cost of both circuits even if they do not presently require them.

Figure 3:
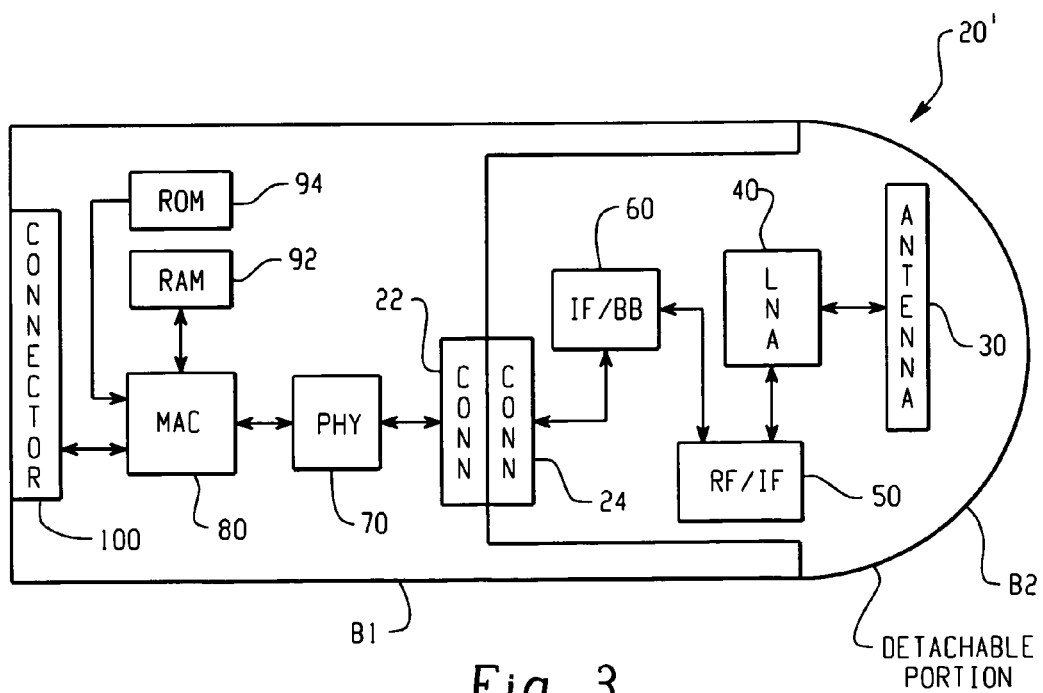
FIG. 3 illustrates a communications module according to a preferred embodiment of the present invention.

Referring now to FIG. 3, there is shown a communications module 20' according to a preferred embodiment of the present invention. In many respects, communications module 20' is similar to communications module 20.

Communications module 20' has a first housing B1 for housing the digital section, and a second housing B2 for housing the antenna section. Housing B2 is detachable from housing B1. Mating connecting members 22 and 24 are used to electrically connect the digital and antenna sections. In accordance with a preferred embodiment, a low or zero insertion force design is provided for interfacing the digital section with the antenna section.

It should be appreciated that communications module 20' may be initially configured with the "universal" digital section and a first detachable antenna section suitable for 802.11b. Thereafter, a second detachable antenna section suitable for 802.11a can be obtained and interchanged with the first detachable antenna section.

A preferred location to electrically separate the digital and antenna sections is between PHY 70 and IF/BB block 60. In this regard, the signals that connect these two elements are commonly known as I (in-phase) and Q (quadrature), and are generally rather universal between the IEEE 802.11b and 802.11a standards. Moreover, these elements do not require expensive coaxial or impedance controlled connectors. However, it should be understood that the inventor contemplates that the electrical separation is suitably made between other elements of communications module 20', depending upon the selected communications standards. The location of electrical separation is preferably selected such that interchangeablility is maintained, and cost is minimized.

Where PHY 70 takes the form of a general purpose DSP, then in accordance with a preferred embodiment of the present invention, the DSP firmware will execute differently depending upon the particular antenna section mated to the digital section. An identifying connection on the connector between the digital and antenna sections may be used to automatically identify the communications standard for use with the connected antenna section. Alternatively, new firmware may be loaded to match the requirements of the attached antenna section.

In the case where PHY 70 takes the form of a specially designed logic circuit, then each modulation scheme may require unique digital circuitry to perform the proper modulation/demodulation. It should be appreciated that this is not necessarily expensive to implement. In this regard, the additional area of an integrated circuit (IC) needed to perform both functions is small in comparison to the overall IC capability, and is possibly achieved for no additional cost. As before, the mated antenna section could be identified with a known connection on the connector between the digital and antenna sections. In this way, the digital section can be made universal at little or no extra cost.

It should be appreciated that in the case of a communications module adapted for use with the IEEE 802.11b and 802.11a standards, the antenna section for 2.4 GHz frequency band communications includes an LNA, while for 5 GHZ frequency band communications the antenna section includes an LNA as well as a 5 to 2.4 GHz converter stage (i.e., conversion from RF to Baseband using RF/IF 50 and IF/BB 60, or alternatively an RF-to-BB converter). The illustrated preferred embodiment provides a "universal" PHY capable of handling both IEEE 802.11b and 802.11a modulations.

As indicated above, one of the advantages of the present invention is the reduction of power consumption, as compared with a conventional "dual standard" communications module. In this regard, it is not always possible to completely unpower circuitry that is not in use. This is particularly important for battery operated devices. As further indicated above, the increased modularity provided by the present invention allows for less expensive upgrades in technology. For example, if new features are added to a communications standard requiring a change in system specifications (e.g., faster MAC processor, larger memory, or new modulation technique) or upgraded communication modules (digital or antenna section) are developed (e.g., better range or lower power consumption), a user can retain the antenna section and interchange it with a modified digital section, or visa versa.

In summary, a communications module is provided with includes an antenna section that is detachable from a digital section. The antenna section includes the final RF stages and band-specific antennas, while the digital section includes the remaining circuitry for completing the communications module.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

The invention claimed is:

1. A communications module comprising:
    a first section with firmware for processing data in accordance with at least a first communication standard, wherein processing data in accordance with at least a first communication standard includes at least one of modulating and demodulation the data, wherein said first section includes a connecting member for electrically connecting said first section with an external HOST processor;
    a second section for transmitting and receiving data via an antenna mounted on the second section in accordance with the first communication standard, said second section detachable from the first section, wherein said second section is replaceable with a third section for transmitting and receiving data via an antenna mounted on the third section in accordance with a second communication standard; and
    a mating connector for coupling the first section to one of the group consisting of the second section and the third section, the mating connector comprising an identifying connector to automatically identify the communications standard for use with the one of the group consisting of the second section and the third section coupled to the first section;
    wherein the firmware will execute differently when coupled to the second section than when connected to the third section.

2. A communications module according to claim 1, wherein said first communication standard uses a first frequency band.

3. A communications module according to claim 1, wherein said second communication standard uses a second frequency band.

4. A communications module according to claim 1, wherein said first section includes a Medium Access Control (MAC) processing system, and a physical layer (PHY) processing device.

5. A communications module according to claim 4, wherein said first section includes at least one memory device.

6. A communications module according to claim 1, wherein said second section includes a first circuit for converting signals between radio frequencies and intermediate frequencies.

7. A communications module according to claim 6, wherein said second section includes a second circuit for converting a signal between intermediate frequencies and baseband frequencies.

8. A communications module according to claim 1, wherein said second section includes a first circuit for converting signals between radio frequencies and baseband frequencies.

9. A communications module according to claim 1, wherein said second section includes a low noise amplifier (LNA).

10. A communications module comprising:
    a first section including means for processing data in accordance with at least a first communication standard, wherein processing data in accordance with at least a first communication standard includes at least one of modulating and demodulation the data, wherein said first section includes a connecting means for electrically connecting said first section with an external HOST processor;
    a second section including means for transmitting and receiving data via an antenna mounted on the second section in accordance with the first communication standard, said second section detachable from the first section; and
    means for electrically connecting the first section with the second section, the means for electrically connecting comprising means for identifying;
    wherein said second section is replaceable with a third section including means for transmitting and receiving data via an antenna mounted on the third section in accordance with a second communication standard;
    wherein said means for identifying identifies one of the group consisting of the second section and the third section coupled to the first section;
    wherein said means for processing data is responsive to the means for identifying to execute differently when the third section is coupled to the first section than when the second section is coupled to the first section; and
    wherein the first section is coupled to not more than one of the group consisting of the second section and the third section concurrently.

11. A communications module according to claim 10, wherein said first communication standard uses a first frequency band.

12. A communications module according to claim 10, wherein said second communication standard uses a second frequency band.

13. A communications module according to claim 10, wherein said first section includes a Medium Access Control (MAC) processing system, and a physical layer (PHY) processing device.

14. A communications module according to claim 13, wherein said first section includes at least one means for storing data.

15. A communications module according to claim 10, wherein said second section includes first conversion means for converting signals between radio frequencies and intermediate frequencies.

16. A communications module according to claim 15, wherein said second section includes a second conversion means for converting a signal between intermediate frequencies and baseband frequencies.

17. A communications module according to claim 10, wherein said second section includes conversion means for converting signals between radio frequencies and baseband frequencies.

18. A communications module according to claim 10, wherein said second section includes means for amplifying a signal.

19. A communications module, comprising:
   a first housing for housing a digital section of the communications module, the first housing comprises:
   a first connecting member for electrically coupling the first section with an external HOST processor,
   a second connecting member,
   a physical layer processor coupled to the second connecting member, and
   a media access control processor coupled to the physical layer processor and the first connecting member; and
   a second housing for housing an RF section of the communications module, the second housing detachable to the first housing and comprises:
   a connecting member for electrically coupling the second section to the second connecting member of the first section and configured to identify a communication standard for use with the second section,
   a circuit for converting between a baseband frequency and an RF frequency coupled to the connecting member, and
   an antenna coupled to the circuit for converting between the baseband frequency and an RF frequency;
   wherein the physical layer processor is responsive to perform one of the group consisting of modulation and demodulation for the communication standard identified by the connecting member for electrically coupling the second section to the second connecting member of the first section.

20. A communications module according to claim 19, further comprising one of the group consisting of a nonvolatile memory and a volatile memory coupled to the media access controller.

21. A communications module according to claim 19, the circuit for converting a baseband signal to an RF signal comprising:
   a circuit for converting the baseband signal to an intermediate frequency coupled to the connecting member; and
   a circuit for converting the intermediate frequency to the RF frequency coupled to the circuit for converting the baseband signal to the intermediate frequency.

22. A communications module according to claim 21, the second section further comprising a low noise amplifier coupled between the circuit for converting the intermediate frequency to the RF frequency and the antenna.

23. A communications module according to claim 19, the physical layer processor further comprising one of the group consisting of an analog to digital converter and a digital to analog converter.

24. A communications module according to claim 19, wherein the baseband frequency of the circuit for converting between a baseband frequency and an RF frequency is coupled to the connecting member for electrically coupling the second section to the second connecting member of the first section, and the RF frequency of the circuit for converting between a baseband frequency and an RF frequency is coupled to the antenna.

25. A communications module according to claim 19, wherein the communications module is a personal computer client adapter and the first connecting member is one of the group consisting of a Personal Computer Memory Card International Association type II connector, a Personal Computer Memory Card International Association extended type II connector, and a Personal Computer Interface connector.

26. A communications module according to claim 19, wherein the second connecting member of the first housing and the connecting member of the second housing are one of the group consisting of a zero insertion force and a low insertion force connector.

* * * * *